(12) United States Patent
Hsu

(10) Patent No.: US 10,382,734 B2
(45) Date of Patent: Aug. 13, 2019

(54) ELECTRONIC DEVICE AND COLOR TEMPERATURE ADJUSTING METHOD

(71) Applicant: Chiun Mai Communication Systems, Inc., New Taipei (TW)

(72) Inventor: Chen-Sheng Hsu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/628,722

(22) Filed: Jun. 21, 2017

(65) Prior Publication Data

US 2017/0374335 A1 Dec. 28, 2017

(30) Foreign Application Priority Data

Jun. 28, 2016 (CN) .......................... 2016 1 0484005

(51) Int. Cl.
| | |
|---|---|
| *H04N 9/73* | (2006.01) |
| *H04N 1/60* | (2006.01) |
| *G03B 7/17* | (2014.01) |
| *G03B 15/05* | (2006.01) |
| *G03B 15/03* | (2006.01) |
| *H04N 5/235* | (2006.01) |

(52) U.S. Cl.
CPC .................. *H04N 9/73* (2013.01); *G03B 7/17* (2015.01); *G03B 15/03* (2013.01); *G03B 15/05* (2013.01); *H04N 1/6086* (2013.01); *H04N 5/235* (2013.01); *H04N 5/2354* (2013.01); *H04N 9/735* (2013.01); *G03B 2215/05* (2013.01)

(58) Field of Classification Search
CPC ..... H04N 5/235; H04N 5/2354; H04N 5/2356
See application file for complete search history.

(56) References Cited

U.S. PATENT DOCUMENTS

2015/0002735 A1\* 1/2015 Moskovchenko ... H04N 5/2354
 348/370
2017/0134625 A1\* 5/2017 Salazar ................... G06T 7/408

FOREIGN PATENT DOCUMENTS

| CN | 104581099 | 4/2015 |
| CN | 105681774 | 6/2016 |
| TW | 200824425 A | 6/2008 |

\* cited by examiner

*Primary Examiner* — Christopher K Peterson
(74) *Attorney, Agent, or Firm* — ScienBiziP, P.C.

(57) ABSTRACT

An electronic device with a camera and a display that can output light to achieve a desired appearance of skin tone is provided. The display outputs light having a color temperature for lighting during picture taking. The electronic device analyzes a color temperature value of a capturing environment and compares that value with a preset value, calculates a difference value according to the comparing, and controls the display to adjust the color temperature of the light accordingly. A color temperature adjusting method of the electronic device is also provided.

13 Claims, 3 Drawing Sheets

ELECTRONIC DEVICE AND COLOR TEMPERATURE ADJUSTING METHOD

FIELD

The subject matter herein generally relates to image-capture, and an electronic device that adjusts color temperature through its screen light and a color temperature adjusting method.

BACKGROUND

Many electronic devices include a back camera and a front camera. The front camera and a screen are on a same side of the electronic device. Typically, electronic device includes several flash lights in the back of the electronic device, which may provide light for the back camera. However, when a user uses the front camera to take pictures, there is no flash light for the front camera, which may lower quality of the pictures.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
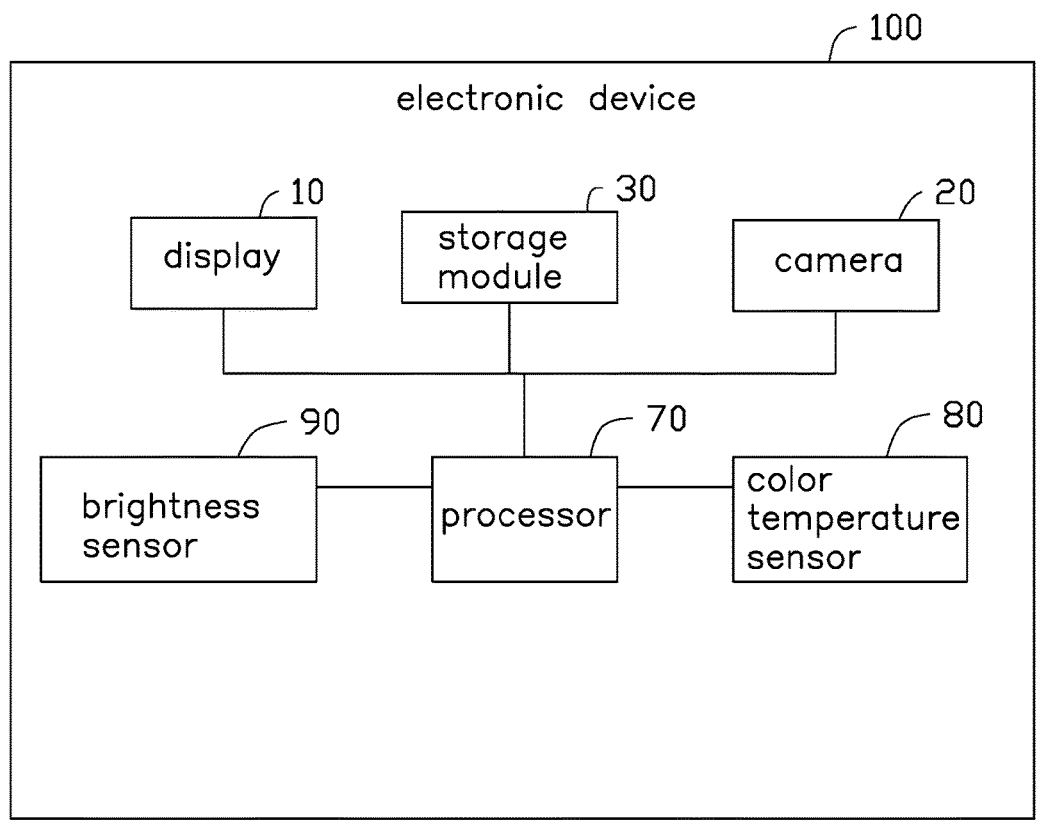
FIG. 1 is a functional block diagram of an exemplary embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising:" when utilized, means "including, but not necessarily limited to"; it specifically indicates open-ended inclusion or membership in the so-described combination, group, series and the like.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY™, flash memory, and hard disk drives. The term "comprising:" means "including, but not necessarily limited to"; it specifically indicates open-ended inclusion or membership in a so-described combination, group, series and the like.

Figure 2:
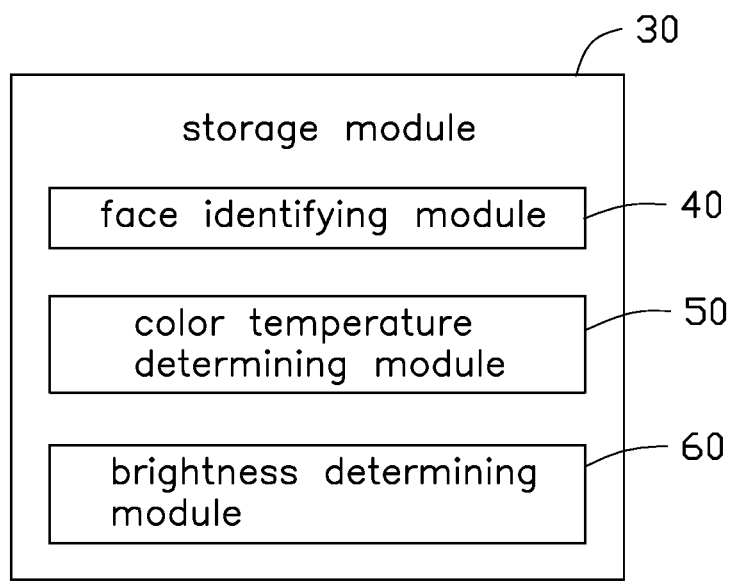
FIG. 2 is a functional block diagram of a storage module of the electronic device of FIG. 1.

FIGS. 1 and 2 illustrate an exemplary embodiment of an electronic device 100. The electronic device 100 can be, but is not limited to, a mobile phone, a tablet computer, a personal digital assistant (PDA), a personal computer or any other electronic devices which provide functions of picture capturing. The electronic device 100 includes a display 10, a camera 20, a storage module 30, a face identifying module 40, a color temperature determining module 50, a brightness determining module 60, a processor 70, a color temperature sensor 80, and a brightness sensor 90. The storage module 30 can be an internal storage device, such as a flash memory, a random access memory (RAM) for temporary storage of parameters, and/or a read-only memory (ROM) for permanent storage of parameters. The storage device 250 can also be an external storage device, such as an external hard disk, a storage card, or a data storage medium. The face identifying module 40, the color temperature determining module 50 and the brightness determining module 60 can comprise computerized instructions in the form of one or more computer-readable programs that can be stored in a non-transitory computer-readable medium, for example the storage module 30, and executed by the processor 70 of the electronic device 100. The processor 70 can be a central processing unit (CPU), a microprocessor, or other data processor chip that performs functions of the electronic device 100.

The display 10 displays a graphical user interface (GUI) in a predetermined color temperature and at a predetermined brightness. The camera 20 is for capturing pictures. In at least one embodiment, the camera 20 and the display 10 are arranged on a same side of the electronic device 100. The color temperature and brightness output by the display 10 provides lighting for a scene to be captured by the camera 20. The display 10 and the camera 20 may capture facial pictures of the user.

The storage module 30 stores the predetermined color temperature and the predetermined brightness of the display 10, and stores a color temperature preset value and a brightness preset value of a desired facial skin color of pictures, and stores pictures captured by the camera 20. In at least one embodiment, the user may select the color temperature preset value and the brightness preset value of the face captured by the camera 20 so the camera captures and image having a desired or preferable skin color and a preferable brightness.

The face identifying module 40 identifies faces from the pictures captured by the camera 20. The color temperature determining module 50 analyzes a color temperature value of the picture captured by the camera 20. In detail, the color temperature determining module 50 analyzes a color temperature value from a part of face of the picture. The brightness determining module 60 analyzes a brightness value of the picture captured by the camera 20. In detail, the brightness determining module 60 analyzes a brightness value from a part of face of the picture identified by the face identifying module 40.

The processor 70 compares the color temperature value and the brightness value of the part of face of the picture and the color temperature preset value and the brightness preset value of the facial skin color stored in the storage module 30, and accordingly adjusts the color temperature and brightness of the light output by the display 10 when the camera 20 captures pictures.

The color temperature sensor 80 detects a color temperature value of present capturing environment and transmits same to the processor 70. The brightness sensor 90 detects a brightness value of present capturing environment and transmits same to the processor 70. In detail, the present capturing environment means that light with the predetermined color temperature and the predetermined brightness or adjusted color temperature and adjusted brightness is output for the current capture environment.

When the user uses the camera 20 of the electronic device 100 to take selfies, the display 10 outputs light with predetermined color temperature and the predetermined brightness to illuminate a capturing environment. The camera 20 captures a picture in the present capturing environment. In at least one embodiment, the picture includes at least one face image. The face identifying module 40 identifies the face from the picture. The color temperature determining module 50 analyzes a color temperature value of the picture including a color temperature value of the face in the picture. The brightness determining module 60 analyzes a brightness value of the picture including a brightness value of the face in the picture identified by the face identifying module 40. The processor 70 compares the analyzed color temperature value and the analyzed brightness value of the face in the picture with the color temperature preset value and the brightness preset value of a facial skin color stored in the storage module 30, and calculates a difference value according to the comparing. The difference value includes a color temperature difference value and a brightness difference value. The processor 70 controls the display 10 to adjust color temperature and brightness of the output light according to the color temperature difference value and the brightness difference value, to achieve an optical illumination. The camera 20 then captures selfies having the facial skin color and brightness of the pictures according to the user's preference. Therefore, the electronic device 100 automatically adjusts light output, to improve captured images.

In another embodiment, the display 10 outputs light with predetermined color temperature and the predetermined brightness for supplying light for a capturing environment. The color temperature sensor 80 detects a color temperature value and the brightness sensor 90 detects a brightness value of the present capturing environment. The processor 70 compares the detected color temperature value and the detected brightness value with the color temperature preset value and the brightness preset value of a facial skin color stored in the storage module 30, and calculates a difference value according to the comparing. The difference value includes a color temperature difference value and a brightness difference value. The processor 70 controls the display 10 to adjust color temperature and brightness of the outputting light according to the color temperature difference value and the brightness difference value to achieve a predetermined lighting effect. The camera 20 captures pictures in the adjusted capturing environment to render the facial skin color and brightness of the pictures according to the user's preference. Therefore, the electronic device 100 automatically adjusts lighting to improve capturing effects.

In another embodiment, when user uses the camera 20 of the electronic device 100 to take selfies, the color temperature sensor 80 detects a color temperature value and the brightness sensor 90 detects a brightness value of the present capturing environment. The processor 70 compares the detected color temperature value and the detected brightness value with the color temperature preset value and the brightness preset value of a facial skin color stored in the storage module 30, and calculates a difference value according to the comparing. The difference value includes a color temperature difference value and a brightness difference value. The processor 70 controls the display 10 to adjust color temperature and brightness of the output light according to the color temperature difference value and the brightness difference value, to achieve a predetermined lighting effect. The camera 20 captures pictures to make the facial skin color and brightness of the pictures achieve the user's preference. Therefore, the electronic device 100 automatically adjusts lighting to improve capturing effect.

In at least one embodiment, user may prefer different capturing skin colors at different time periods. The user may reset the color temperature preset value and the brightness preset value of a facial skin color accordingly, using the GUI. The updated color temperature preset value and brightness preset value can be stored in the storage module 30.

In at least one embodiment, user may selectively switch off the color temperature adjusting function of the electronic device 100 using the GUI. When the user switches off the color temperature adjusting function of the electronic device 100, the display 10 outputs light with the predetermined color temperature and the predetermined brightness, but does not automatically adjust the color temperature and brightness.

Figure 3:
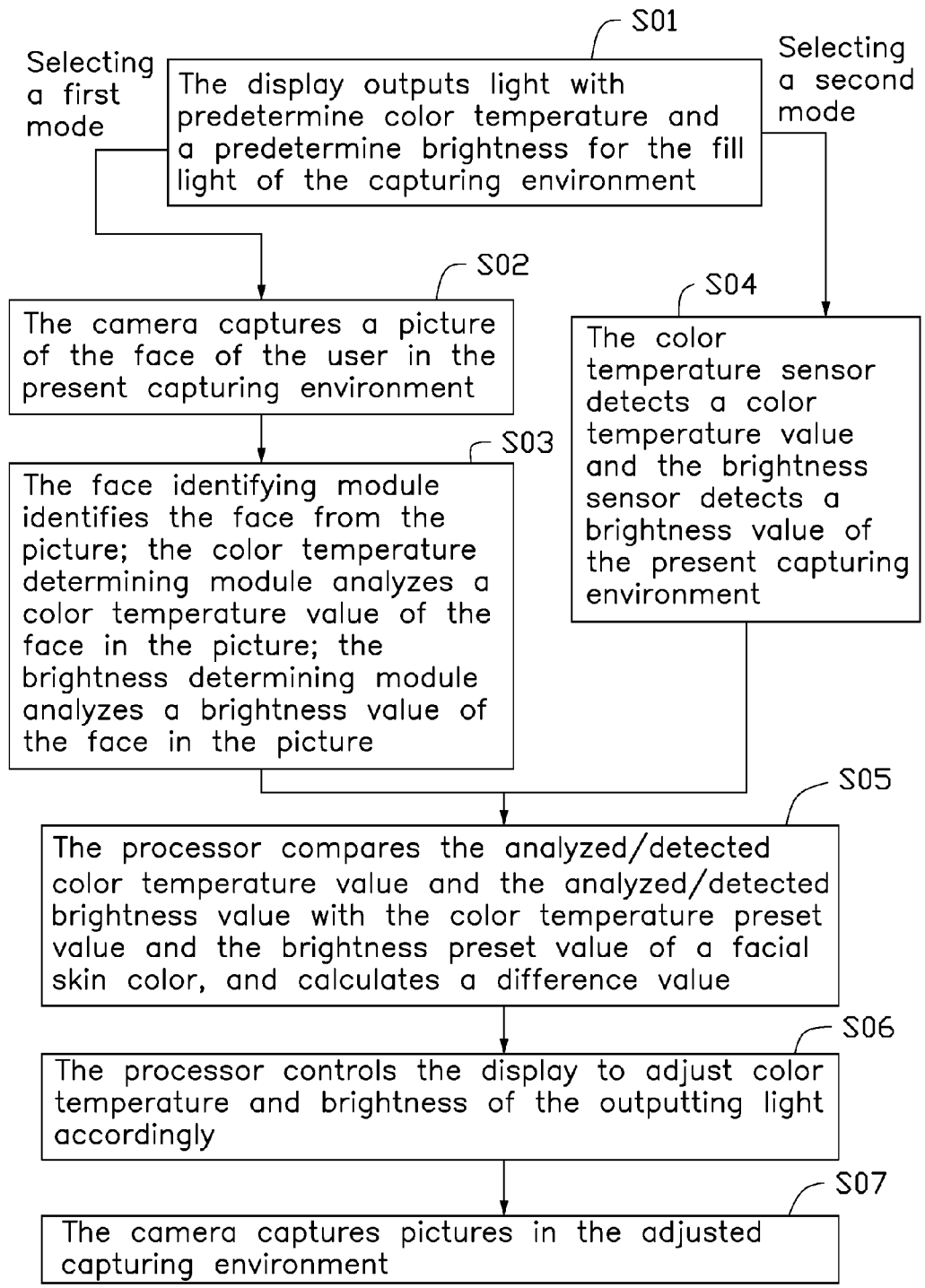
FIG. 3 is a flow chart of an exemplary embodiment of a color temperature adjusting method for the electronic device of FIG. 1.

FIG. 3 illustrates a flowchart of an exemplary embodiment of a color temperature adjusting method of the electronic device 100. In at least one embodiment, the method is performed by execution of computer-readable software program codes or instructions by at least one processor of the electronic device.

Referring to FIG. 3, a flowchart is presented in accordance with an exemplary embodiment. The method is provided by way of example, as there are a variety of ways to carry out the method. The method described below can be carried out using the configurations illustrated in FIGS. 1 and 2, for example, and various elements of these figures are referenced in explaining method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S01.

At block S01, the display 10 outputs light with predetermined color temperature and a predetermined brightness for the lighting of the capturing environment. If a first mode is selected by user, the procedure goes to block S02; if a second mode is selected by user, the procedure goes to block S04. In at least one embodiment, the user may select the first mode or the second mode by the GUI of the electronic device 100.

At block S02, the camera 20 captures a picture of the face of the user in the present capturing environment. In at least one embodiment, the picture includes at least one face image.

At block S03, the face identifying module 40 identifies the face from the picture; the color temperature determining module 50 analyzes a color temperature value of the picture including a color temperature value of the face in the picture identified by the face identifying module 40; the brightness determining module 60 analyzes a brightness value of the picture including a brightness value of the face in the picture identified by the face identifying module 40. The procedure goes to block S05.

At block S04, the color temperature sensor 80 detects a color temperature value of the present capturing environment and the brightness sensor 90 detects a brightness value of the present capturing environment.

At block S05, the processor 70 compares the analyzed/detected color temperature value and the analyzed/detected brightness value with the color temperature preset value and the brightness preset value of a facial skin color stored in the storage module 30, and calculates a difference value according to the comparing. The difference value includes a color temperature difference value and a brightness difference value.

At block S06, the processor 70 controls the display 10 to adjust color temperature and brightness of the outputting light according to the color temperature difference value and the brightness difference value to achieve a predetermined lighting effect.

At block S07, the camera 20 captures pictures in the adjusted capturing environment to make the facial skin color and brightness of the pictures according to the user's preference.

In another embodiment, when the second mode is selected, the block S01 can be omitted, the procedure begins at block S04.

The electronic device 100 calculates a difference value by comparing an analyzed/detected color temperature value and an analyzed/detected brightness value with the color temperature preset value and the brightness preset value of a facial skin color, thus the display 10 automatically adjusts color temperature and brightness of the outputting light accordingly, therefore, the camera 20 may capture pictures close to the user's preferable facial skin color and brightness.

It is believed that the exemplary embodiments and their advantages will be understood from the foregoing description, and it will be apparent that various changes may be made thereto without departing from the scope of the disclosure or sacrificing all of its advantages. The examples herein described are mere illustrative exemplary embodiments of the disclosure.

What is claimed is:

1. An electronic device, comprising:
   a camera for capturing a picture; and
   a display displaying a graphical user interface (GUI) and outputting light for lighting during picture taking;
   a face identifying module identifying at least one face in the picture to be captured by the camera;
   a color temperature determining module analyzing a color temperature value from a part of the at least one face of the picture;
   a brightness determining module analyzing a brightness value from a part of the at least one face of the picture; and
   a processor;
   wherein the electronic device stores a color temperature preset value and a brightness preset value; and
   the processor compares the analyzed color temperature value and the analyzed brightness value of the at least one face in the picture to be captured with the color temperature preset value and the brightness preset value, and calculates a color temperature difference value and a brightness difference value; and controls the display to adjust a color temperature and a brightness of the light according to the color temperature difference value and the brightness difference value.

2. The electronic device as claimed in claim 1, further comprising:
   a color temperature sensor detecting a color temperature value of a present capturing environment; and
   the processor comparing the detected color temperature value of the present capturing environment and the color temperature preset value, and calculating the color temperature difference value according to the comparing, and controlling the display to adjust the color temperature of the light according to the color temperature difference value.

3. The electronic device as claimed in claim 1, further comprising:
   a color temperature sensor detecting a color temperature value of a present capturing environment;
   a brightness sensor detecting a brightness value of the present capturing environment; and
   a processor comparing the detected color temperature value and the detected brightness value of the present capturing environment with the color temperature preset value and the brightness preset value, and calculating the color temperature difference value and the brightness difference value according to the comparing, and controlling the display to adjust the color temperature and the brightness of the light according to the color temperature difference value and the brightness difference value.

4. The electronic device as claimed in claim 1, wherein the display and the camera are arranged on a same side of the electronic device and are used together for capturing pictures, the color temperature and the brightness of the light output by the display provide lighting to a capturing environment of the camera.

5. The electronic device as claimed in claim 1, wherein the GUI allows a user to select and reset the color temperature preset value and the brightness preset value.

6. The electronic device as claimed in claim 1, wherein the GUI allows a user to selectively switch on or off a color temperature adjusting function of the electronic device.

7. A color temperature adjusting method of an electronic device, the color temperature adjusting method comprising:
   storing a color temperature preset value and a brightness preset value;
   displaying a graphical user interface (GUI) by a display of the electronic device;
   outputting light by the display for lighting during picture taking;
   capturing a picture by a camera of the electronic device;
   identifying at least one face in the picture to be captured by the camera;
   analyzing a color temperature value and a brightness value from a part of the at least one face in the picture to be captured;
   comparing the analyzed color temperature value and the analyzed brightness value of the at least one face in the picture to be captured with the color temperature preset value and the brightness preset value;

calculating a color temperature difference value and a brightness difference value according to the comparing; and controlling the display to adjust a color temperature and a brightness of the light according to the color temperature difference value and the brightness difference value.

8. The color temperature adjusting method as claimed in claim 7, further comprising:

detecting a color temperature value of a present capturing environment by a color temperature sensor;

comparing the detected color temperature value of the present capturing environment and the color temperature preset value;

calculating the color temperature difference value according to the comparing; and controlling the display to adjust the color temperature of the light according to the color temperature difference value.

9. The color temperature adjusting method as claimed in claim 7, further comprising:

detecting a color temperature value of a present capturing environment by a color temperature sensor;

detecting a brightness value of the present capturing environment by a brightness sensor;

comparing the detected color temperature value and the detected brightness value of the present capturing environment with the color temperature preset value and the brightness preset value;

calculating the color temperature difference value and the brightness difference value according to the comparing; and controlling the display to adjust the color temperature and the brightness of the light according to the color temperature difference value and the brightness difference value.

10. The color temperature adjusting method as claimed in claim 7, wherein the display and the camera are arranged on a same side of the electronic device and are used together for capturing pictures, the color temperature and the brightness of the light output by the display provides lighting to a capturing environment of the camera.

11. The color temperature adjusting method as claimed in claim 7, wherein the GUI allows a user to select and reset the color temperature preset value and the brightness preset value.

12. The color temperature adjusting method as claimed in claim 7, wherein the GUI allows a user to selectively switch on or off a color temperature adjusting function of the electronic device.

13. The color temperature adjusting method as claimed in claim 7, further comprising:

selecting a first mode or a second mode based on the GUI;

analyzing the color temperature value and the brightness value of the at least one face of the picture in the first mode; and detecting the color temperature value and the brightness value of the present capturing environment by the color temperature sensor and the brightness sensor in the second mode.

* * * * *